(12) United States Patent
Kinkel et al.

(10) Patent No.: US 12,365,282 B2
(45) Date of Patent: Jul. 22, 2025

(54) SUPPORT FOR A COMPONENT IN THE FRONT OR IN THE REAR OF A MOTOR VEHICLE, LIGHTING DEVICE, AND UNIT FOR A MOTOR VEHICLE, AND METHOD FOR MANUFACTURING THE SUPPORT

(71) Applicant: HELLA GmbH & Co. KGaA, Lippstadt (DE)

(72) Inventors: Sven Kinkel, Borchen (DE); Michael Lakenbrink, Oelde (DE); Juergen Scharte, Dellbrueck (DE); Thomas Wiese, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/642,247

(22) Filed: Apr. 22, 2024

(65) Prior Publication Data
US 2024/0351512 A1    Oct. 24, 2024

(30) Foreign Application Priority Data
Apr. 20, 2023   (DE) ............ 10 2023 109 990.6

(51) Int. Cl.
*B60Q 1/04*  (2006.01)
*B60Q 1/00*  (2006.01)
(Continued)

(52) U.S. Cl.
CPC ......... *B60Q 1/0483* (2013.01); *B60Q 1/0023* (2013.01); *B60Q 1/0408* (2013.01);
(Continued)

(58) Field of Classification Search
CPC ................................. B60Q 1/0483
(Continued)

(56) References Cited

U.S. PATENT DOCUMENTS

2011/0279304 A1* 11/2011 Yonemoto ............ H01Q 19/062
                                                                   342/52
2012/0315414 A1   12/2012 Wesch et al.
(Continued)

FOREIGN PATENT DOCUMENTS

| DE | 102009054999 A1 | 6/2011 |
|----|-----------------|--------|
| DE | 102021112972 A1 | 11/2022 |
| DE | 102021121278 A1 | 2/2023 |

OTHER PUBLICATIONS

Vieyra et al., Engineering, Recyclable, and Biodegradable Plastics in the Automotive Industry: A Review Horacio Vieyra, Polymers 2022, 14, 3412, MDPI (Year: 2022).*

*Primary Examiner* — Keith G. Delahoussaye
(74) *Attorney, Agent, or Firm* — Muncy, Geissler, Olds & Lowe, P.C.

(57) ABSTRACT

A support for a component in the front or in the rear of a motor vehicle, in particular for a lighting device or for a sensor unit, or for a module within a lighting device of a motor vehicle, in particular for a light module. The support includes a support body, at least one receiving section for receiving the component or the module at the support, and at least one connecting section for connecting the support to the front or to the rear of the motor vehicle or for connecting the support to the lighting device. The support body includes at least one plastic part and at least one metallic part that is connected to the plastic part. The plastic part has, at least in part, a material component made of a sustainable plastic.

14 Claims, 7 Drawing Sheets

(51) Int. Cl.
  *B60Q 1/30* (2006.01)
  *F21S 41/19* (2018.01)
(52) U.S. Cl.
  CPC .............. *B60Q 1/302* (2013.01); *F21S 41/19* (2018.01); *F21S 2243/00* (2024.05)
(58) Field of Classification Search
  USPC .................................. 264/911–920; 362/459
  See application file for complete search history.

(56) References Cited

U.S. PATENT DOCUMENTS

| | | | |
|---|---|---|---|
| 2015/0197214 A1* | 7/2015 | Marur ..................... | B60R 21/34 29/428 |
| 2018/0354405 A1* | 12/2018 | Harrington, Jr. .... | B60Q 1/0686 |
| 2020/0062194 A1 | 2/2020 | Paperi | |
| 2023/0051752 A1 | 2/2023 | Baier et al. | |
| 2024/0083340 A1* | 3/2024 | Brinkmeier ....... | B29C 45/14377 |

\* cited by examiner

SUPPORT FOR A COMPONENT IN THE FRONT OR IN THE REAR OF A MOTOR VEHICLE, LIGHTING DEVICE, AND UNIT FOR A MOTOR VEHICLE, AND METHOD FOR MANUFACTURING THE SUPPORT

This nonprovisional application claims priority under 35 U.S.C. § 119(a) to German Patent Application No. 10 2023 109 990.6, which was filed in Germany on Apr. 20, 2023, and which is herein incorporated by reference.

BACKGROUND OF THE INVENTION

Field of the Invention

The present invention relates to a support for a component in the front or in the rear of a motor vehicle, in particular for a lighting device or for a sensor unit, or for a module within a lighting device of a motor vehicle. The invention further relates to a lighting device, to a unit having such a support, and to a method for manufacturing the support.

Description of the Background Art

Supports for functional components in the front or in the rear of motor vehicles, in particular for lighting devices such as headlights or taillights or for sensor units for surroundings detection, are designed as plastic-metal hybrid parts, for example, that are adapted to the particular thermomechanical requirements during operation of the vehicle. These types of hybrid parts are also used as supports for modules within functional units, such as for light modules in headlights. The plastic component of such hybrid parts is typically formed by synthetic thermoplastics such as polycarbonate, polyamide, polypropylene, or polyethylene, or by synthetic thermosetting plastics such as synthetic resins, and may contain embedded glass fibers for reinforcement.

SUMMARY OF THE INVENTION

It is therefore an object of the present invention to provide a support for a component in the front or in the rear of a motor vehicle or for a module within the component, and in particular to meet greater demands on environmental sustainability of the support.

In an example, a support is provided for a component in the front or in the rear of a motor vehicle, in particular for a lighting device or for a sensor unit, or for a module within a lighting device of a motor vehicle, in particular for a light module, the support including a support body, at least one receiving section for receiving the component or the module at the support, and at least one connecting section for connecting the support to the front or to the rear of the motor vehicle or for connecting the support to the lighting device, the support body including at least one plastic part and at least one metallic part that is connected to the plastic part, the plastic part having, at least in part, a material component made of a sustainable plastic.

The invention proceeds from the concept of substituting the plastics, commonly used in the prior art, that are synthetically produced and not biodegradable, with representatives of the so-called sustainable plastics. These sustainable plastics have a sufficient thermomechanical load-bearing capacity so that, as hybrid parts in combination with metallic parts, they meet the requirement for supports for the above-mentioned applications to be met during operation of motor vehicles. In the present case, the term "sustainable plastic" encompasses plastics that have been obtained or recycled, at least in part, from renewable raw materials and/or that are biodegradable. The latter may be enzymatically degraded by microorganisms, with water, carbon dioxide, and biomass remaining as end products of the degradation process. Biodegradable plastics may, but do not have to, be produced from renewable raw materials.

In particular, the material component of a sustainable plastic is based on a plant or animal raw material. With plant raw materials, all are referred to as renewable raw materials. By-products of the slaughter of animals, of materials that are produced by/collected from animals, or of animal husbandry, for example, are considered as animal raw materials.

For example, the material component of a sustainable plastic includes a thermoplastic based on starch, cellulose, polylactic acid, polyhydroxybutyric acid, lignin, or chitin. These thermoplastics represent sustainable plastics based on renewable raw materials. In addition, the plastic part may include a composite material with fibrous or particulate reinforcements that are based on wood, hemp, flax, jute, sisal, bamboo, or fruit seeds as renewable raw materials.

Compared to conventional plastics, sustainable plastics typically have lower strength, so that greater material thicknesses may possibly have to be provided. To compensate for the accompanying increase in weight, the plastic part of the support according to the invention may advantageously have a porous microstructure, in particular with pore diameters in the range of 1-50 microns.

The support according to the invention may in particular have a rigid and stable design, so that a component of the vehicle body, a crossmember, for example, is replaceable by the support; i.e., the support may function as a structural component of the body. The accommodated component then is not connected to a crossmember of the vehicle body via the housing, as is customary in the prior art, but, rather, by means of the support according to the invention is structurally integrated into the body, and is fastened to side members of the body, for example, for which purpose the connecting sections are used.

To form the support, the plastic part can be connected to the metallic part in a form-fit manner, for which purpose manufacture by injection molding is particularly suited.

The receiving section of the support for receiving the component to be supported and/or the connecting section for connecting the support to the motor vehicle or to the lighting device are/is designed, for example, in one piece with the plastic part or the metallic part. Alternatively, the receiving section and/or the connecting section may be designed as a thermoplastic plastic part or as a metal part, for example a die-cast part, which are/is suitably connected to the support body, in particular via a form-fit connection.

For example, the support body can have a sandwich structure made up of at least two metallic parts, in particular two sheet metal parts, and at least one section of the plastic part situated in between.

The support body can have a frame-like shape for externally enclosing the component to be accommodated at the support, or a module to be accommodated. For example, the support body may be provided for circumferentially surrounding a housing of the component.

The support body can be designed as a flat part, and has at least one receiving opening for a sensor unit. This example is provided in particular for integrating the support into the skirt of a motor vehicle, for example into the front end, the sensor unit typically being provided for surroundings monitoring.

The invention further relates to a lighting device for a motor vehicle, in particular a headlight, at least including a support according to the invention, a light module, a housing, and a cover plate, wherein the light module, the housing, and/or the cover plate are/is accommodated at a receiving section of the support.

The invention further relates to a unit for integration into the front or the rear of a motor vehicle, at least including a support according to the invention and a sensor unit, in particular a camera, a lidar sensor, or a radar sensor, wherein the sensor unit is accommodated in a receiving opening of the support body at a receiving section of the support.

Furthermore, the invention relates to a method for manufacturing a support according to the invention, comprising the following steps: providing at least one metallic part, for example a sheet metal part produced by a stamping/bending process, or a die-cast part, inserting the metallic part into an injection mold, and injection-molding the plastic part from an injection molding compound, using a material component that is based on a renewable raw material and/or is biodegradable, to form a form-fit connection to the metallic part, wherein for forming the plastic part with a porous microstructure, the injection molding compound is provided using an admixed chemical propellant, or a propellant gas is blown into the injection molding compound.

The form-fit connection may be established by overmolding or through-molding of the part, or the part is provided with undercut surface structures to establish the form-fit connection to the plastic part. A plurality of metallic parts may be inserted and integrated into the support to establish form-fit connections to the plastic part. In addition, metal or plastic elements for forming the receiving sections and/or connecting sections of the support may be inserted into the injection mold and likewise connected to the injection-molded plastic part in a form-fit manner. Alternatively, the receiving section and/or the connecting section of the support are/is integrally formed onto the plastic part in one piece during the injection molding of the plastic part. The at least one metallic part is a sheet metal part, for example, that is produced by a stamping/bending process or is designed as a die-cast part. In particular, the metallic part may have a porous microstructure, and in particular may be designed as a metal foam part, resulting in further weight savings for the support according to the invention.

The formation of the porous microstructure of the plastic part is achieved by use of chemical or physical propellants in the injection molding. Sodium hydrogen carbonate and a citric acid derivative, for example, are suitable as chemical propellants. These are admixed with the injection molding compound, and decompose when the injection molding compound melts, wherein gases such as carbon dioxide or nitrogen are released and mix with the melt. During the injection process into the mold, the gas is exposed to the effect of heat and pressure, so that it expands and ultimately results in a porous solidification structure in the plastic part.

A propellant gas, for example, an inert gas such as nitrogen or carbon dioxide, functions as a physical propellant, and is blown into the melted injection molding compound via a gas metering station in order to then mix it in the plasticizing unit to form a single-phase solution (MuCell® process). When this single-phase solution is injected into the injection mold, the pressure exerted on the mixture drops, and massive formation and expansion of gas bubbles in the injection molding compound occur.

As a result of using chemical or physical propellants, weight reductions of the plastic part, compared to a reference of 5% to 10% that is injected without propellant, are preferably achieved for the support according to the invention Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
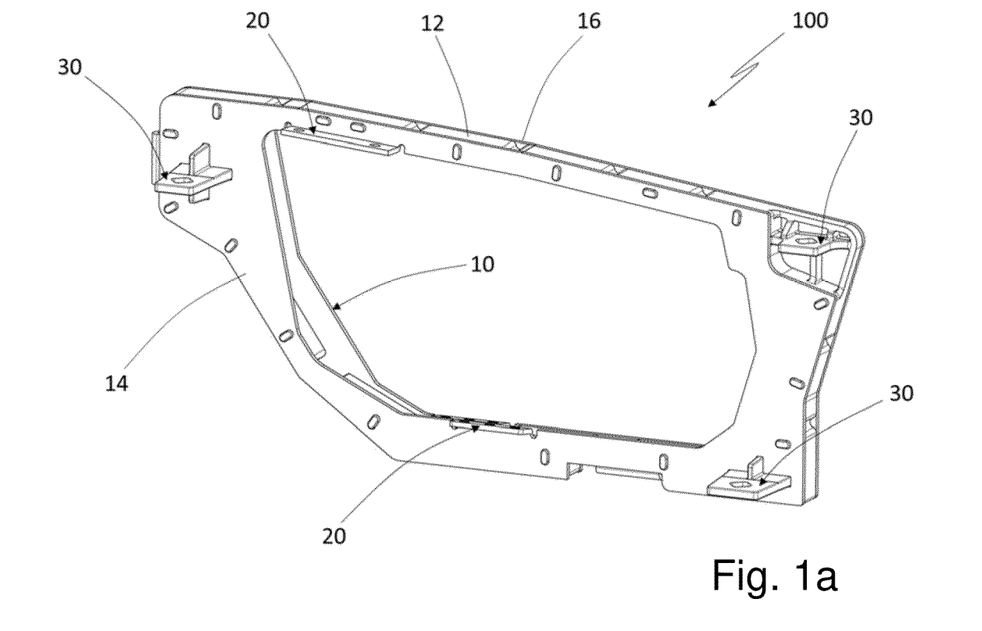
FIGS. 1a and 1b show perspective views of an example of a support according to the invention.
Figure 1B:
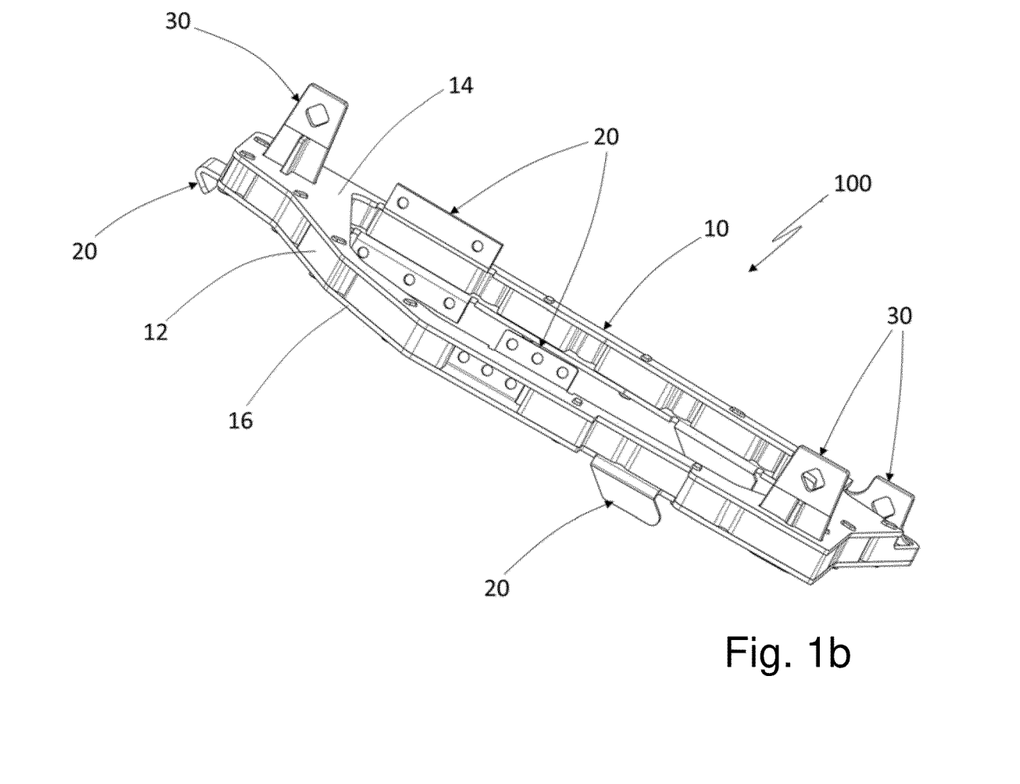

FIGS. 1a and 1b show perspective views of an example of a support 100 according to the invention, in which the support body 10 has a sandwich structure made up of the two metallic parts 14, 16 in the form of sheet metal parts, and the section of the plastic part 12 situated in between. The form-fit connection between the metallic parts 14, 16 and the plastic part 12 is achieved by through-molding of the openings circumferentially arranged in the metallic parts 14, 16. The support 100 also includes the receiving sections 20 for receiving a component, as well as the connecting sections 30 for connecting the support 100 to a motor vehicle, which are each designed in the form of protruding tabs with openings for accommodating screws or rivets. The receiving sections 20 are designed in one piece with the metallic parts 14, 16, and the connecting sections 30 are designed in one piece with the plastic part 12. The support body 10 has a frame-like shape for externally enclosing a component to be accommodated at the support 100, or a module to be accommodated.

The illustrated plastic parts 12 can each include, at least in part, a material component made of a sustainable plastic, and can have a porous microstructure.

Figure 2:
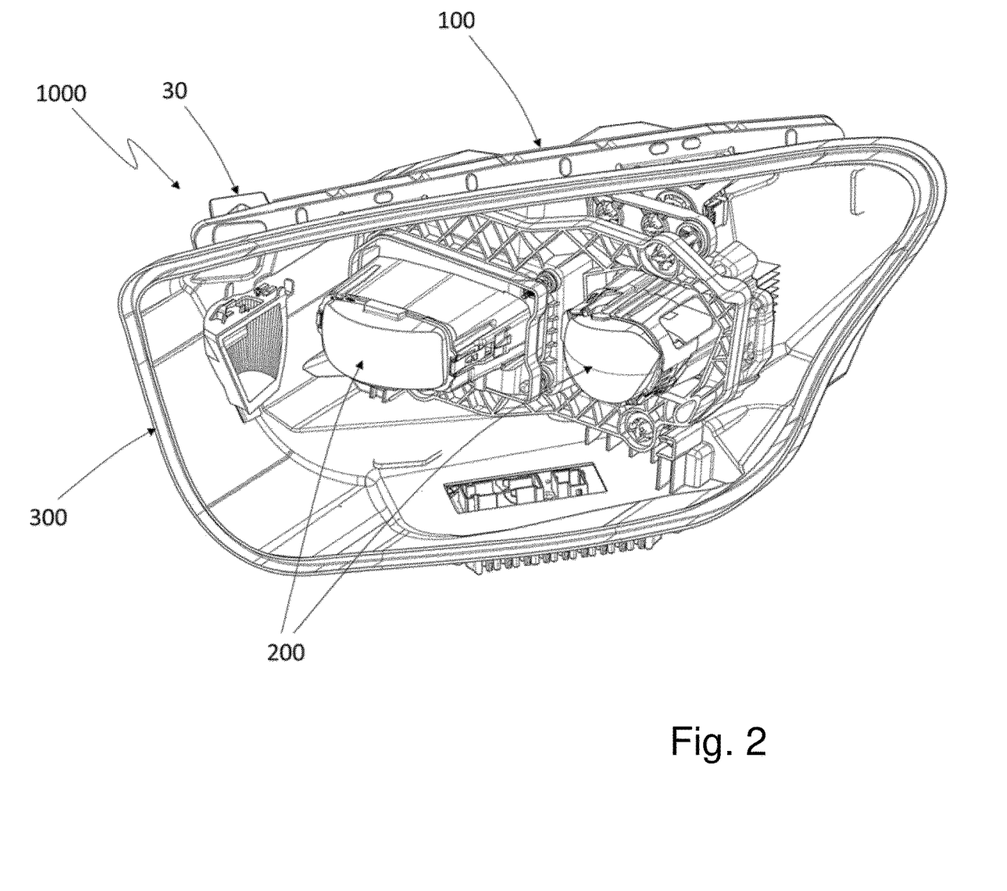
FIG. 2 shows a perspective view of an example of a lighting device according to the invention.

FIG. 2 shows an example of a lighting device 1000 according to the invention in the form of a headlight, including a support 100 according to the invention which externally encloses the housing 300 in a frame-like manner, and which is accommodated at the receiving sections. In the present case, the two light modules 200 are accommodated at the housing 300 via a shared module; alternatively, receiving sections of the support 100 according to the invention could extend through the wall of the housing 300 and be used for accommodating the light modules 200 directly at the support 100. It is provided to incorporate the lighting device 1000 into a vehicle body via the connecting sections 30 of the support 100, the rigid support 100 being suitable for replacing a crossmember of the body, and thus itself functioning as a structural body component.

Figure 3A:
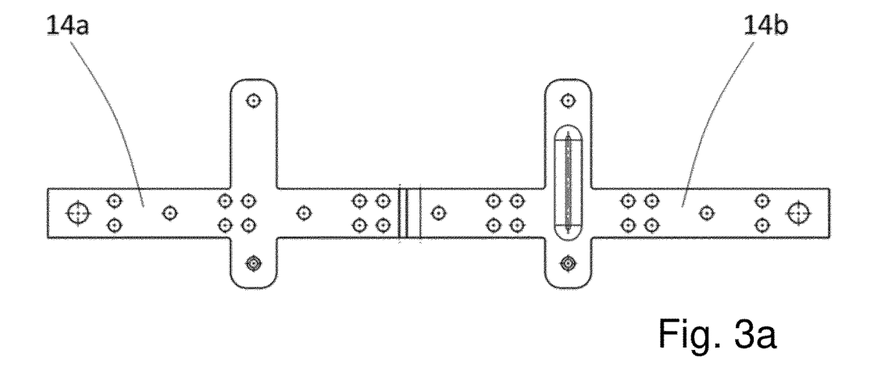
FIGS. 3a to 3c show Illustrations of an example of the method according to the invention.
Figure 3B:
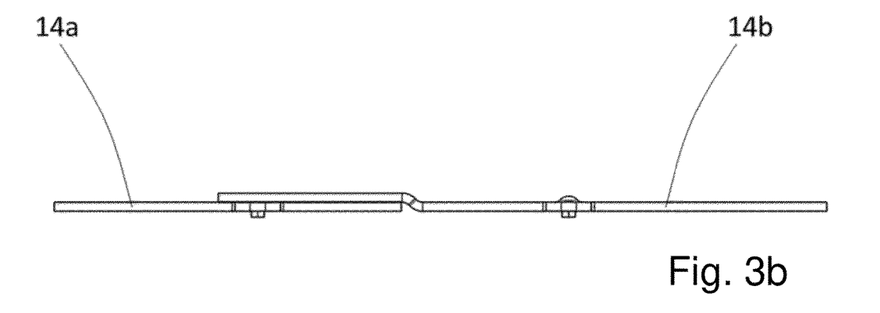
Figure 3C:
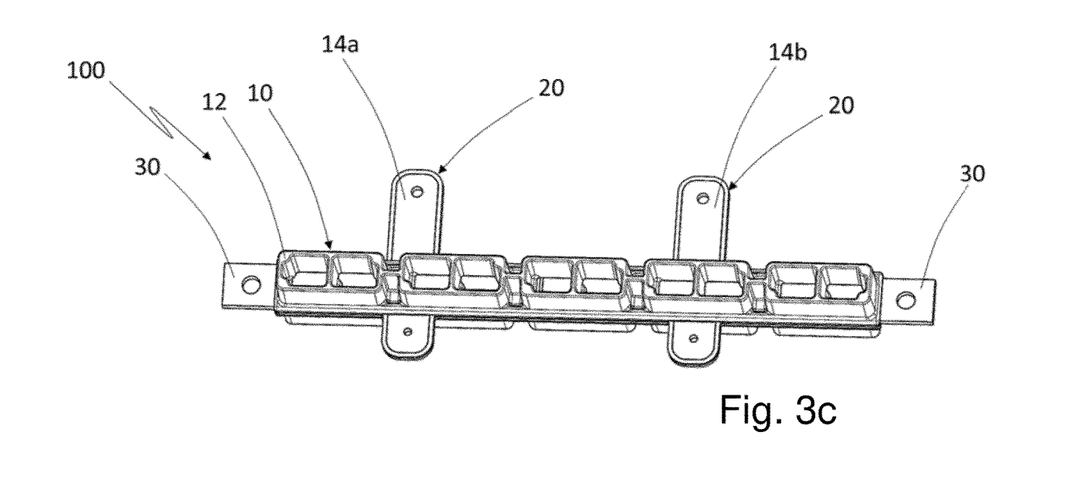

FIGS. 3a through 3c illustrate an example of the method according to the invention. FIG. 3a shows a top view and FIG. 3b shows a cross section of two metallic parts 14a, 14b, which in the illustrated arrangement are inserted into the injection mold and overmolded with the plastic part 12 in a form-fit manner to form the support body 10. The receiving sections 20 and the connecting sections 30 are formed by sections of the metallic parts 14a, 14b, the former being overmolded on the edge side here.

Figure 4:
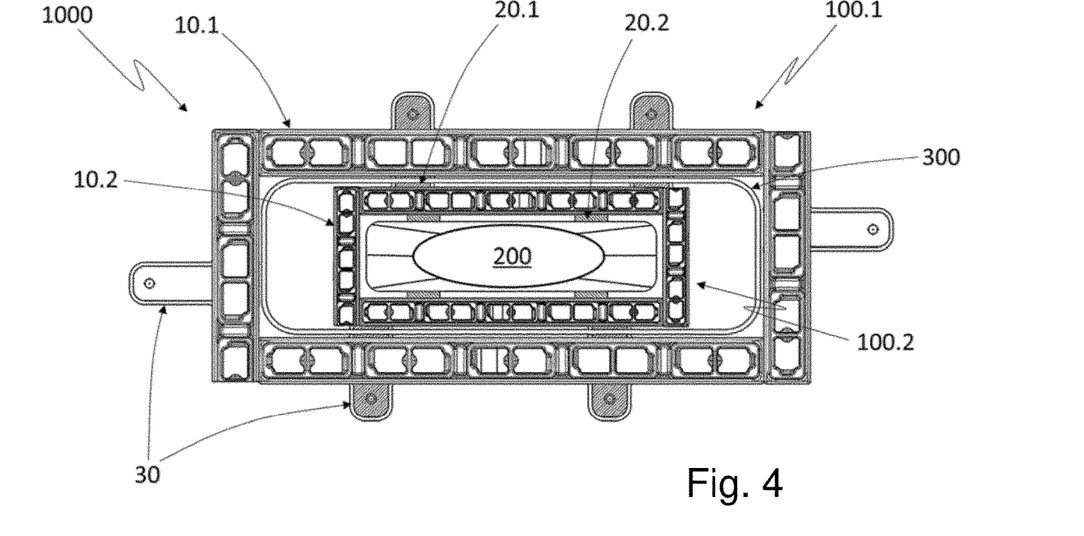
FIG. 4 shows a cross-sectional view of an example of a lighting device according to the invention.

FIG. 4 shows a front cross-sectional view of an example of the lighting device 1000 according to the invention, including the light module 200, the housing 300, and two supports 100.1, 100.2 according to the invention. The outer support 100.1 is used for connecting to a vehicle body via the connecting sections 30, and for accommodating the inner support 100.2 by means of the receiving sections 20.1 which protrude through the housing 300. The inner support 100.2 accommodates the light module 200 via the receiving sections 20. The light module 200 is thus connected to the vehicle body solely by supports 100.1, 100.2 according to the invention, so that the lighting device 1000 is characterized by a particularly stable and accurate position and orientation of the light module 200 relative to the vehicle body. In particular, the housing 300 is used not as a supporting part for the light module 200, but, rather, solely as a seal for the interior of the lighting device 1000.

Figure 5:
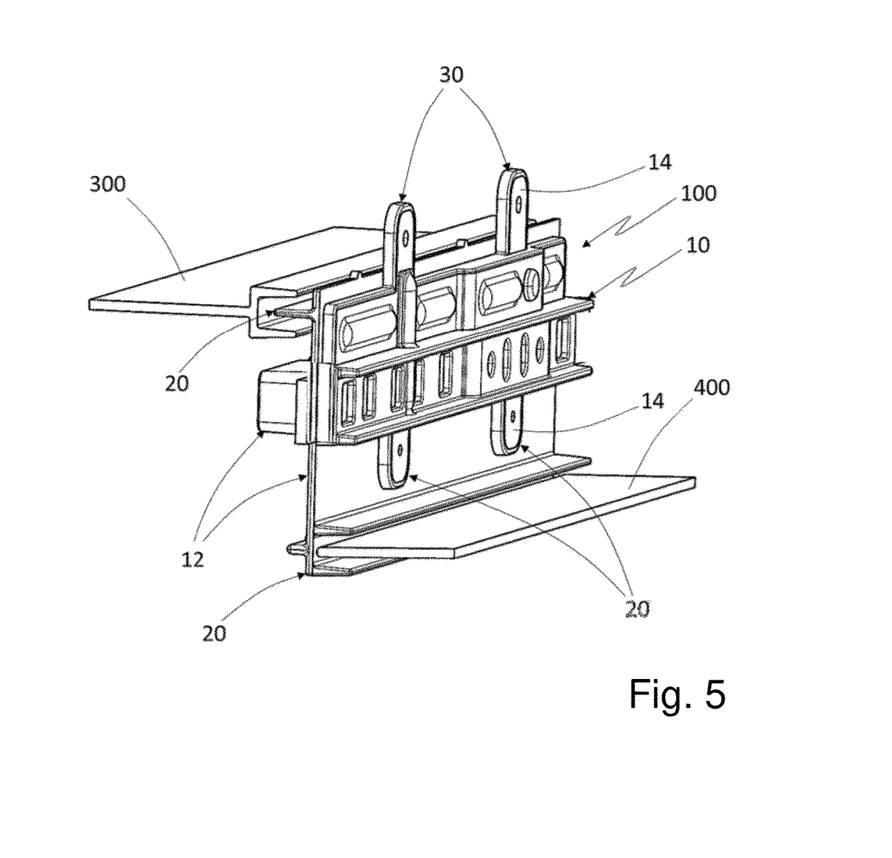
FIG. 5 shows a partial view of an example of a lighting device according to the invention.
Figure 6:
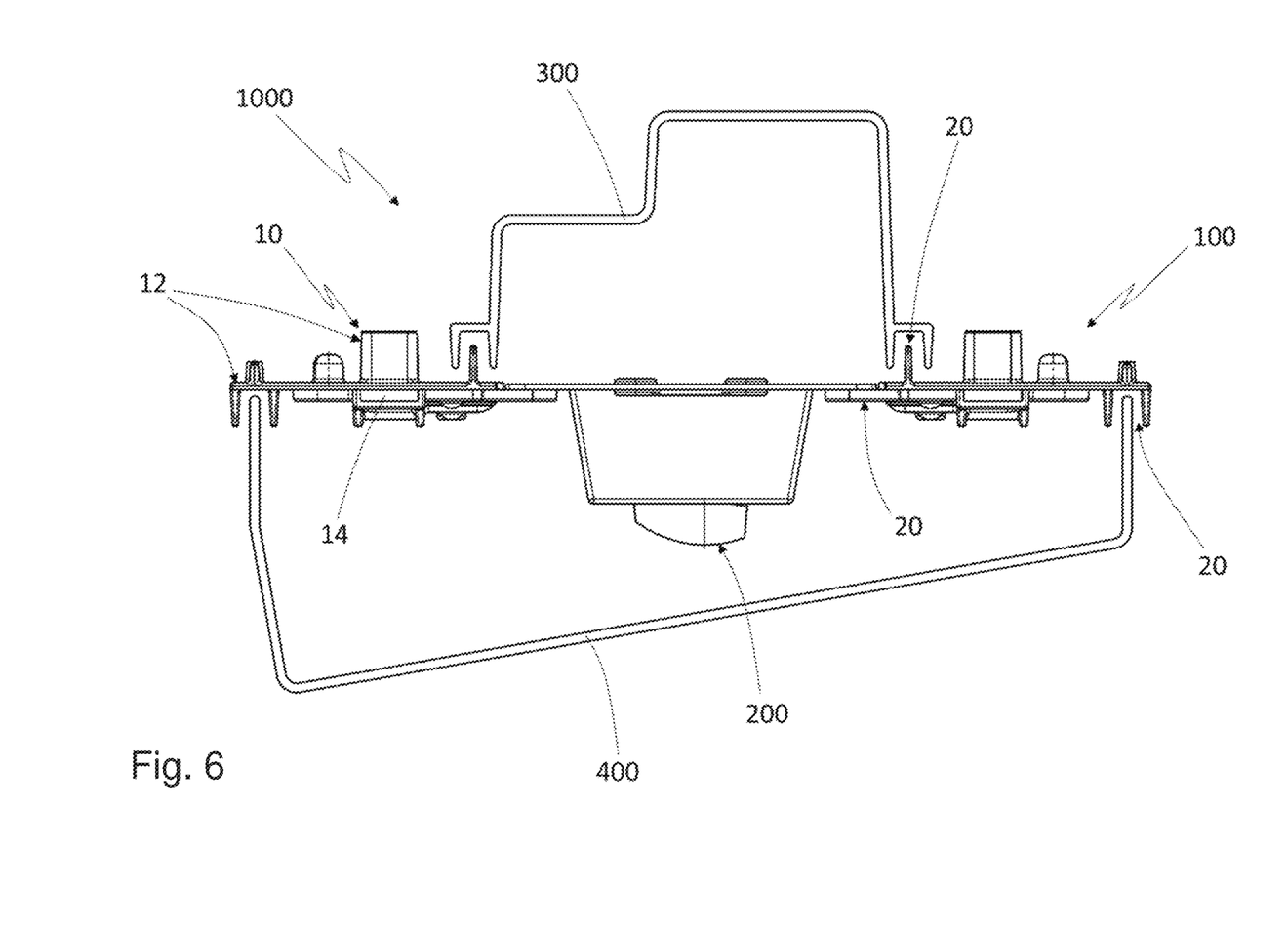
FIG. 6 shows a cross-sectional view of the example of a lighting device according to the invention.

FIG. 5 shows a partial view of an example of a lighting device 1000 according to the invention, and FIG. 6 shows an associated cross-sectional view. The support 100 in each case is designed with receiving sections 20 for receiving a rear housing 300 and a front cover plate 400. The support body 10, as a hybrid part, includes the plastic part 12 and the segmented sheet metal part 14 that is overmolded in a form-fit manner.

Figure 7A:
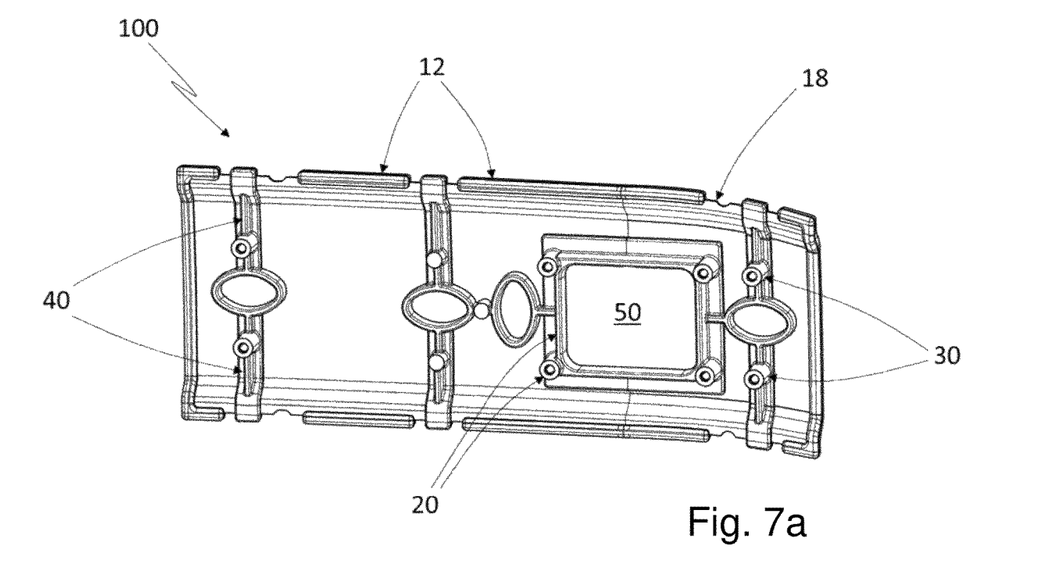
FIG. 7a shows a perspective view of an example of a support according to the invention.
Figure 7B:
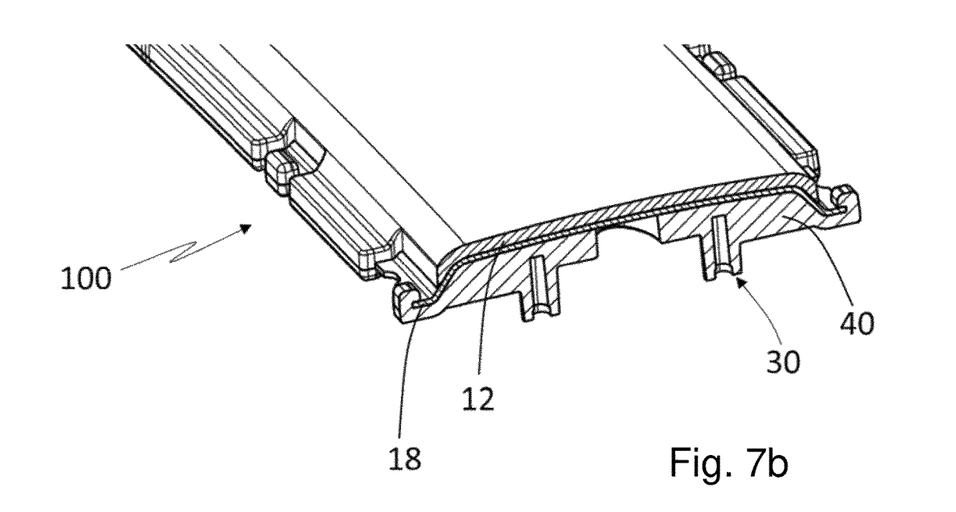
FIG. 7b shows a cross-sectional view of FIG. 7a, and FIG. 8 shows a perspective view of an example of a unit according to the invention.
Figure 8:
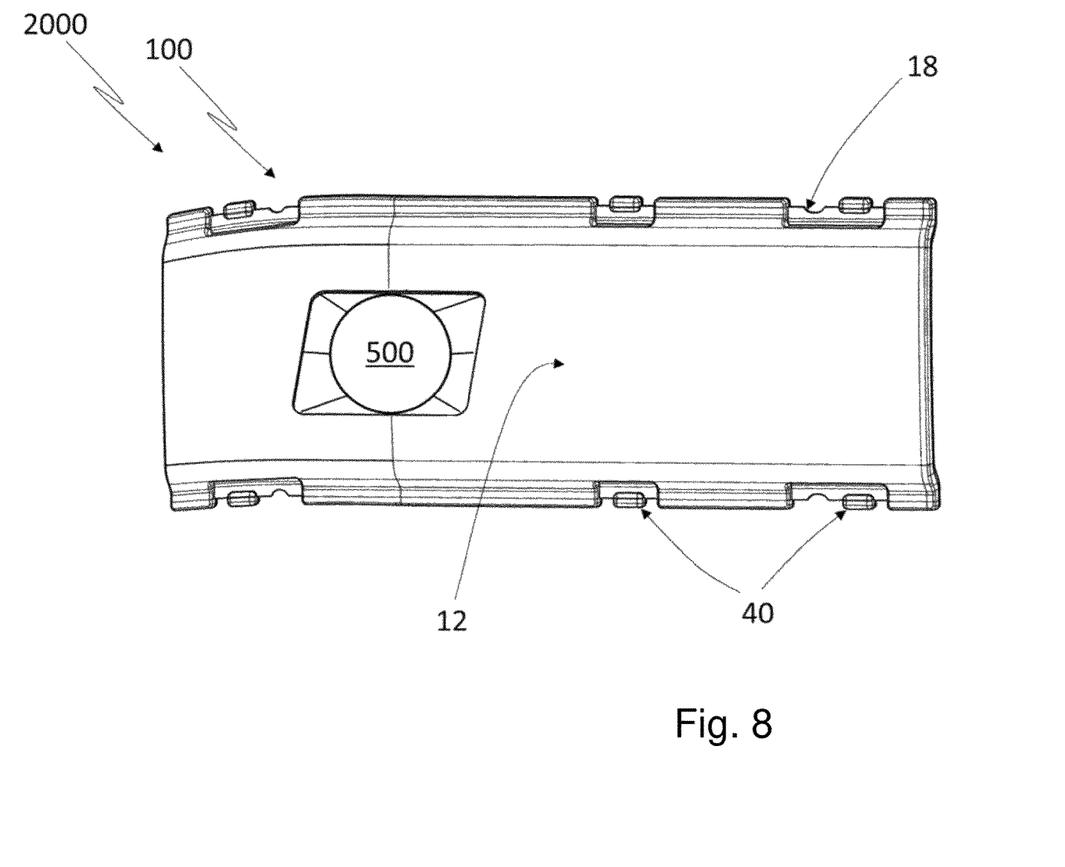

FIG. 7a shows a rear view of an example of a support 100 according to the invention, and FIG. 7b shows an associated cross-sectional view. FIG. 8 shows a unit 2000 according to the invention, based on this support 100, for integration into a skirt in the front or in the rear of a motor vehicle. The support body 10 is designed as a flat part, and includes the receiving opening 50 together with the sensor unit 500 accommodated therein, which is designed in particular as a camera, a lidar sensor, or a radar sensor for surroundings detection. Despite the small mounting depth of the panel-shaped support body 10, due to its hybrid design made up of the metallic part 18 and the plastic part 12 the support body has mechanical properties that enable the support 100 to durably accommodate the sensor unit 500 with positional accuracy. The rib-shaped reinforcement structures 40 on the rear side of the support body 10 also contribute in this regard. The reinforcement structures 40 and the receiving section 20, bordering the receiving opening 50, for connecting the sensor unit 500, and the connecting sections 30 designed as screw bosses for fastening to the motor vehicle, are likewise preferably made of a sustainable plastic, the same as for the plastic part 12.

The implementation of the invention is not limited to the preferred exemplary embodiments stated above. Rather, a number of variants are conceivable which make use of the described approach, also for basically different types of designs. All features and/or advantages, including structural details, spatial configurations, and method steps, that arise from the claims, the description, or the drawings may be important to the invention, alone or also in the various combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A support for a component in a front or in a rear of a motor vehicle, the support comprising:
   a support body;
   at least one receiving section to receive the component at the support; and
   at least one connecting section to connect the support to the front or to the rear of the motor vehicle or for connecting the support to a lighting device,
   wherein the support body comprises at least one plastic part and at least one metallic part that is connected to the plastic part, the plastic part having, at least in part, a material component made of a sustainable plastic,
   wherein the material component made of the sustainable plastic is based on a renewable raw material or a plastic recycled material and/or is biodegradable, and
   wherein the plastic part has a porous microstructure with pore diameters in the range of 1 micron to 50 microns.

2. The support according to claim 1, wherein the component is a lighting device, a sensor, a module within a lighting device, and/or a light module.

3. The support according to claim 1, wherein the material component made of the sustainable plastic is based on a plant or animal raw material.

4. The support according to claim 1, wherein the material component made of the sustainable plastic includes a thermoplastic based on starch, cellulose, polylactic acid, polyhydroxybutyric acid, lignin, or chitin.

5. The support according to claim 1, wherein the plastic part includes a composite material with sustainable fibrous or particulate reinforcements that are based on wood, hemp, flax, jute, sisal, bamboo, or fruit seeds.

6. The support according to claim 1, wherein the plastic part is connected to the metallic part in a form-fit manner.

7. The support according to claim 1, wherein the receiving section and/or the connecting section are designed in one piece with the plastic part or the metallic part.

8. The support according to claim 1, wherein the support body has a sandwich structure made up of at least two metallic parts or two sheet metal parts, and at least one section of the plastic part arranged in between.

9. The support according to claim 1, wherein the support body has a frame shape for externally enclosing the component to be accommodated at the support, or a module to be accommodated.

10. The support according to claim 1, further comprising a sensor unit, wherein the support body is designed as a flat part, and has at least one receiving opening for the sensor unit.

11. A lighting device or a headlight for a motor vehicle, comprising:
    the support according to claim 1;

a light module;
a housing; and
a cover plate,
wherein the light module, the housing, and/or the cover plate are accommodated at a receiving section of the support.

12. A unit for integration into a front or a rear of a motor vehicle, comprising:
the support according to claim 10; and
the sensor unit,
wherein the sensor unit is a camera, a lidar sensor, or a radar sensor, and
wherein the sensor unit is accommodated in the receiving opening of the support body at a receiving section of the support.

13. A method for manufacturing the support according to claim 1, the method comprising:
providing the at least one metallic part;
inserting the metallic part into an injection mold; and
injection-molding the plastic part from an injection molding compound having, at least in part, the material component made of the sustainable plastic that is based on a renewable raw material and/or is biodegradable, to form a form-fit connection to the metallic part,
wherein the plastic part is formed with the porous microstructure having the pore diameters in the range of 1 micron to 50 microns by providing the injection molding compound with an admixed chemical propellant, or a propellant gas that is blown into the injection molding compound.

14. The method according to claim 13, wherein the at least one metallic part is a sheet metal part produced by a stamping/bending process or is a die-cast part.

* * * * *